United States Patent
Chang et al.

(10) Patent No.: US 12,532,863 B2
(45) Date of Patent: Jan. 27, 2026

(54) PROTECTOR WORN ON A HORSE LEG

(71) Applicant: JONE SHOU INDUSTRIAL CO., LTD., Nantou Township, Nantou County (TW)

(72) Inventors: Chih Shun Chang, Caotun Township, Nantou County (TW); Michael Loveridge, Lyndhurst (GB)

(73) Assignees: JONE SHOU INDUSTRIAL CO., LTD., Caotun Township (TW); Evolution Horseware Ltd., Lyndhurst (GB)

( * ) Notice: Subject to any disclaimer, the term of this patent is extended or adjusted under 35 U.S.C. 154(b) by 116 days.

(21) Appl. No.: 18/617,310

(22) Filed: Mar. 26, 2024

(65) Prior Publication Data

US 2024/0224938 A1 Jul. 11, 2024

Related U.S. Application Data

(63) Continuation-in-part of application No. 17/563,835, filed on Dec. 28, 2021, now abandoned.

(51) Int. Cl.
*A01K 13/00* (2006.01)
*A61D 9/00* (2006.01)

(52) U.S. Cl.
CPC .............. *A01K 13/007* (2013.01); *A61D 9/00* (2013.01)

(58) Field of Classification Search
CPC ................................ A01K 13/007; A61D 9/00
See application file for complete search history.

(56) References Cited

U.S. PATENT DOCUMENTS

| | | | |
|---|---|---|---|
| 3,913,302 | A | 10/1975 | Centers |
| 5,472,413 | A | 12/1995 | Detty |
| 9,254,215 | B2 | 2/2016 | Mueller |
| 9,827,132 | B2 | 11/2017 | Mueller et al. |
| 2014/0283851 | A1 | 9/2014 | Dowson et al. |
| 2017/0014216 | A1 | 1/2017 | Boraas et al. |
| 2019/0307594 | A1 | 10/2019 | Gibson et al. |
| 2023/0180717 | A1* | 6/2023 | Chang .................. A01K 13/007 54/82 |

FOREIGN PATENT DOCUMENTS

| | | | | |
|---|---|---|---|---|
| CN | 214087702 U | * | 8/2021 | .......... A01K 13/007 |
| DE | 20 2009 016 732 U1 | | 5/2010 | |
| EP | 2186401 A1 | * | 5/2010 | .......... A01K 13/007 |
| FR | 2 570 273 A1 | | 3/1986 | |

(Continued)

OTHER PUBLICATIONS

WO 2021/244895 A1 machine translation (Year: 2021).

*Primary Examiner* — Son T Nguyen
(74) *Attorney, Agent, or Firm* — MUNCY, GEISSLER, OLDS & LOWE, P.C.

(57) ABSTRACT

A protector worn on a horse leg includes a first piece and a second piece located above the first piece. The second piece is connected to the first piece via a first connecting portion so that the second piece is movable relative to the first piece. A first gap is formed between the first piece and the second piece. A size of the first gap becomes smaller when the horse leg is straightened and becomes larger when the horse leg is bent. Both the first piece and the second piece fit on the horse leg all the time when running, not disturbing the movement and relieving discomfort of the horse.

7 Claims, 8 Drawing Sheets

(56) References Cited

FOREIGN PATENT DOCUMENTS

| KR | 10-2020-0041041 A | 4/2020 |
|---|---|---|
| TW | M500604 U | 5/2015 |
| TW | M564908 U | 8/2018 |
| WO | WO-95/00011 A1 | 1/1995 |
| WO | WO-2021/244895 A1 | 12/2021 |

\* cited by examiner

PROTECTOR WORN ON A HORSE LEG

CROSS REFERENCE TO RELATED APPLICATION

This application is a Continuation-in-Part of co-pending application Ser. No. 17/563,835 filed on Dec. 28, 2021, the entire contents of which are hereby incorporated by reference.

BACKGROUND OF THE INVENTION

1. Technical Field

The present invention relates to equestrian equipment and more particularly to a protector worn on a horse leg.

2. Description of Related Art

A horse had been used as a means of transportation since ancient times because of fast running and high stamina. Being a mortal body, however, horses naturally get sick or injured and thus are unable to contribute to humankind. For example, a horse, when running or jumping, gets injured in such a case that the hind legs are raised forward while the front legs have not yet moved forward, causing the front legs being kicked by the hind legs and having wounds. The wounds are easily getting worse as a result of bacterial infections.

To solve the problem above-mentioned, a protector is equipped on the horse leg to reduce injuries after the front leg being kicked by the hind leg. A conventional protector for horse leg which is disclosed in Taiwan Utility Patent No. M564908 includes a sleeve body extending in a longitudinal direction for a certain length. It is made of hard material such as hard plastic or metal plate and supplemented with soft cushion as an inner lining. Since the horse leg is not straight, along with bending during running, the sleeve body cannot fit on the surface of the leg, causing discomfort to the horse and disturbance of running.

BRIEF SUMMARY OF THE INVENTION

The primary objective of the present invention is to provide a protector worn on a horse leg that is able to be deformed to fit on the leg all the time when the horse is running. In addition, movement of the horse is not disturbed so as to run well.

To achieve the above objective, the present invention provides a protector worn on horse leg that includes a first piece and a second piece located above the first piece. The second piece is connected to the first piece via a first connecting portion so that the second piece is movable relative to the first piece. A first gap is formed between the first piece and the second piece. A size of the first gap becomes smaller when the horse leg is straightened and becomes larger when the horse leg is bent.

Preferably, the first piece includes a curved first middle portion. Each of two opposite sides of the first middle portion has a first wing portion configured to cover the horse leg.

In addition, the second piece includes a curved second middle portion. Each of two opposite sides of the second middle portion has a second wing portion configured to cover the horse leg. A length of the second wing portion is less than that of the first wing portion. At least one of an upper edge and a lower edge of the second piece is in an arc.

Preferably, at least one of an upper edge and a lower edge of the first piece is in an arc.

Preferably, the first piece includes a supporting portion connected with the first connecting portion. The supporting portion forms a polygon and is connected to a remaining part of the first piece via a rib.

Preferably, a third piece is located above the second piece. The third piece is connected to the second piece via a second connecting portion. The third piece is movable relative to the second piece. A second gap is formed between the third piece and the second piece. A size of the second gap becomes smaller when the horse leg is straightened and becomes larger when the horse leg is bent.

DETAILED DESCRIPTION OF THE INVENTION

Figure 1:
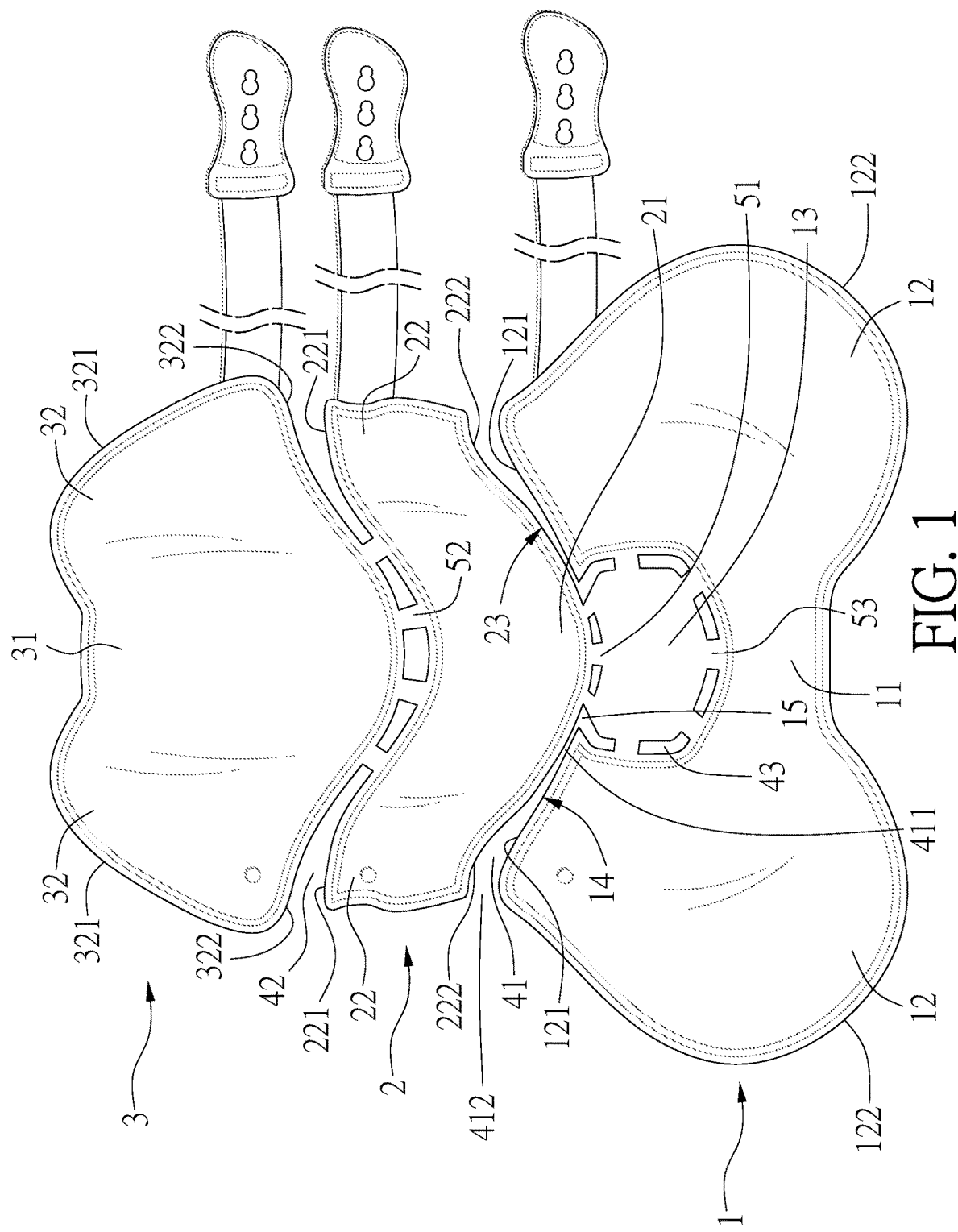
FIG. 1 is a plan view of the present invention which is flattened.

Referring to FIG. 1, the protector worn on a horse leg according to the present invention includes a first piece 1, a second piece 2 and a third piece 3 that are connected in sequence. A first gap 41 is formed between the first piece 1 and the second piece 2, and the first piece 1 is connected to the second piece 2 via a first connecting portion 51. A second gap 42 is formed between the second piece 2 and the third piece 3, and the second piece 2 is connected to the third piece 3 via a second connecting portion 52. In this embodiment, both the first connecting portion 51 and the second connecting portion 52 are short ribs arranged at intervals.

The first piece 1 includes a first middle portion 11 which is curved to fit on the surface of the horse leg. Each of two opposite sides of the first middle portion 11 integrally connects with a first wing portion 12 for covering the horse leg. Each of an upper edge 121 and a lower edge 122 of the first wing portion 12 forms in an arc so as to facilitate the fitness for the horse leg.

The first piece 1 further includes a supporting portion 13 which is located above the first middle portion 11. A third gap 43 is formed between the supporting portion 13 and the first middle portion 11, and the supporting portion 13 is connected to the first middle portion 11 via a plurality of short ribs 53 arranged at intervals. In this embodiment, the supporting portion 13 forms a hexagon. The first connecting portion 51 is disposed at the top of the supporting portion 13.

The second piece 2 includes a second middle portion 21 which is curved to fit on the surface of the horse leg. Each of two opposite sides of the second middle portion 21 integrally connects with a second wing portion 22 for covering the horse leg. Each of an upper edge 221 and a lower edge 222 of the second wing portion 22 forms in an arc so as to facilitate the fitness for the horse leg. In this embodiment, a length of the second wing portion 22 is less than that of the first wing portion 12.

The third piece 3 includes a third middle portion 31 which is curved to fit on the surface of the horse leg. Each of two opposite sides of the third middle portion 31 integrally connects with a third wing portion 32 for covering the horse leg. Each of an upper edge 321 and a lower edge 322 of the third wing portion 32 forms in an arc so as to facilitate the fitness for the horse leg. In this embodiment, a length of the third wing portion 32 is less than that of the first wing portion 12 but greater than that of the second wing portion 22.

The first gap 41 has a first end 411 and a second end 412, the first end 411 is close to the first connecting portion 51, the second end 412 is far away from the first connecting portion 51. A width of the first gap 41 is enlarged from the first end 411 to the second end 412.

A concave edge 14 is formed on an upper side of the first piece 1, a protrusion edge 23 is formed on a lower side of the second piece 2 and is faced to the concave edge 14. A hole is formed on the first piece 1, an outlet 15 of the hole is communicated with the concave edge 14, the supporting portion 13 is arranged in the hole and is connected to the first piece 1 via the short ribs 53, and the protrusion edge 23 is connected to the supporting portion 13 via the short ribs 53 of the outlet 15. Thus, the short ribs 53 are radially arranged around the supporting portion 13 to increase the bending capacity of the first piece 1.

Figure 2:
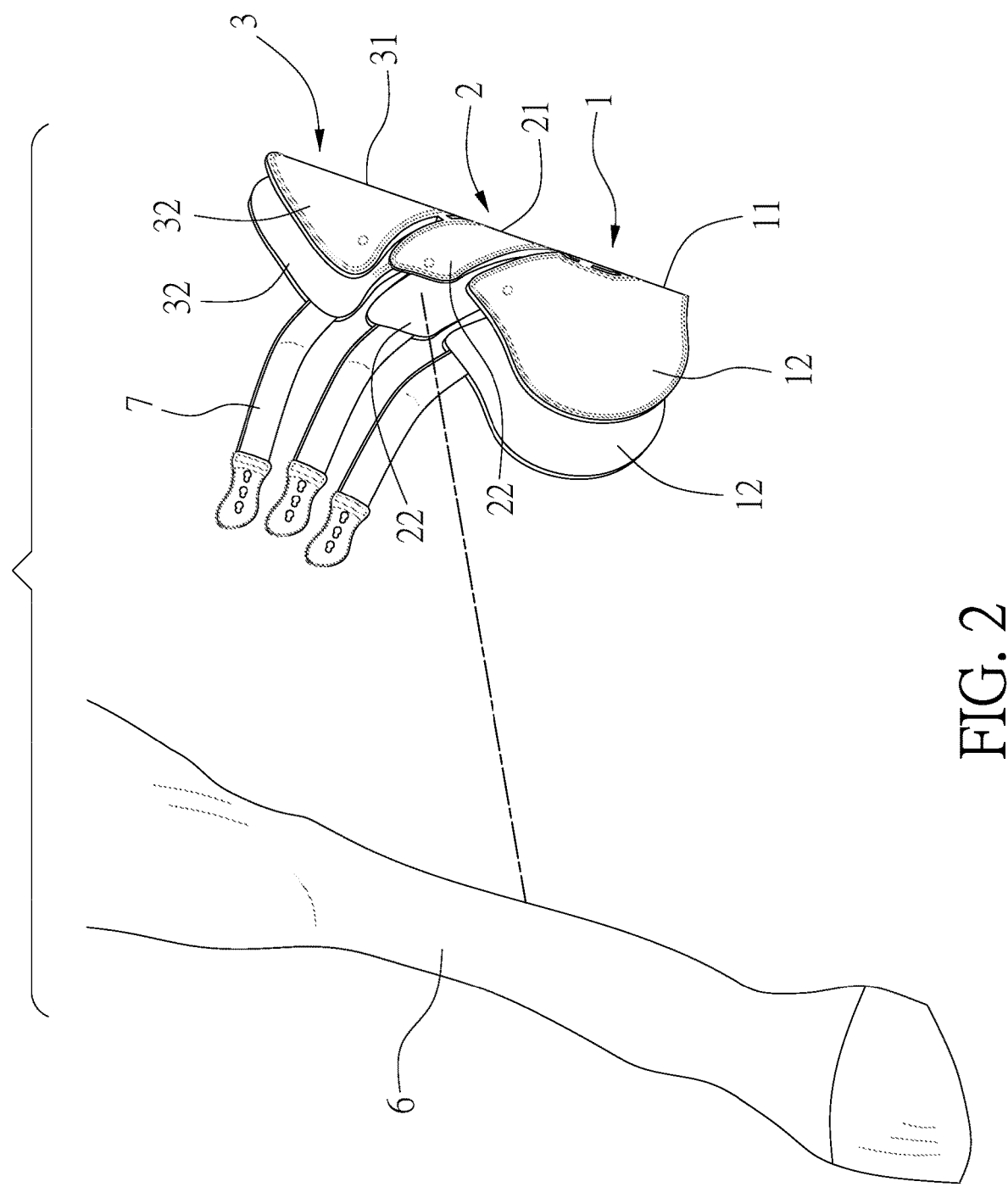
FIG. 2 and FIG. 3 show that the present invention is tied to a horse leg.

Referring to FIG. 2, put the first middle portion 11 of the first piece 1, the second middle portion 21 of the second piece 2 and the third middle portion 31 of the third piece 3 at the back of the horse leg 6, further wrap the horse leg 6 with the first wing portion 12, the second wing portion 22 and the third wing portion 32, and then tie the protector on the horse leg 6 with straps 7. All of the first piece 1, the second piece 2 and the third piece 3 are able to fit on the horse leg 6 due to the arc shapes of the first wing portion 12, the second wing portion 22 and the third wing portion 32. According to this, the present invention plays a protective role when a leg is kicked by another leg.

Figure 3:
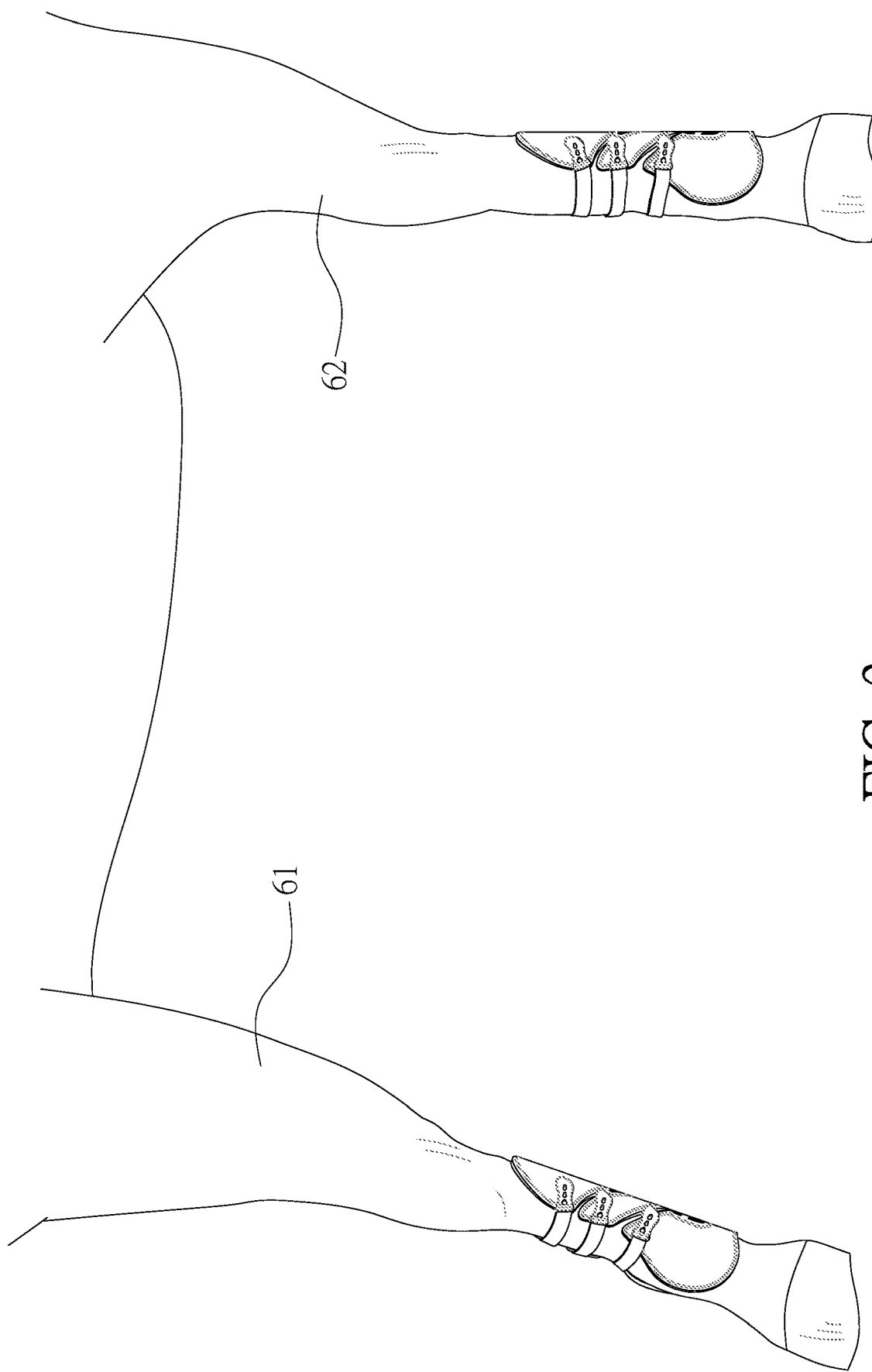
Figure 4:
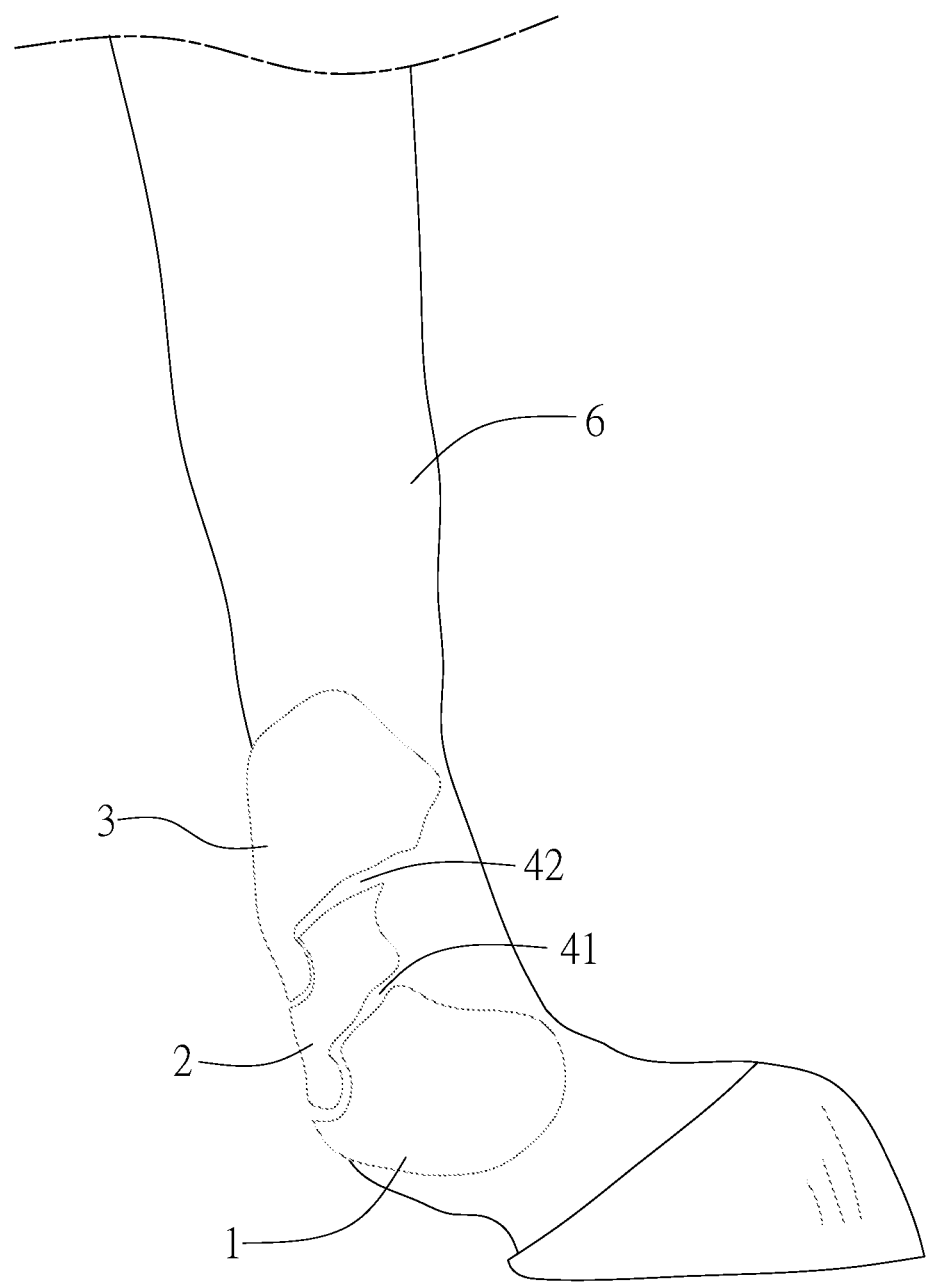
FIG. 4-FIG. 8 show that how the present invention changes in shape during the movement of the horse when the horse is running.
Figure 5:
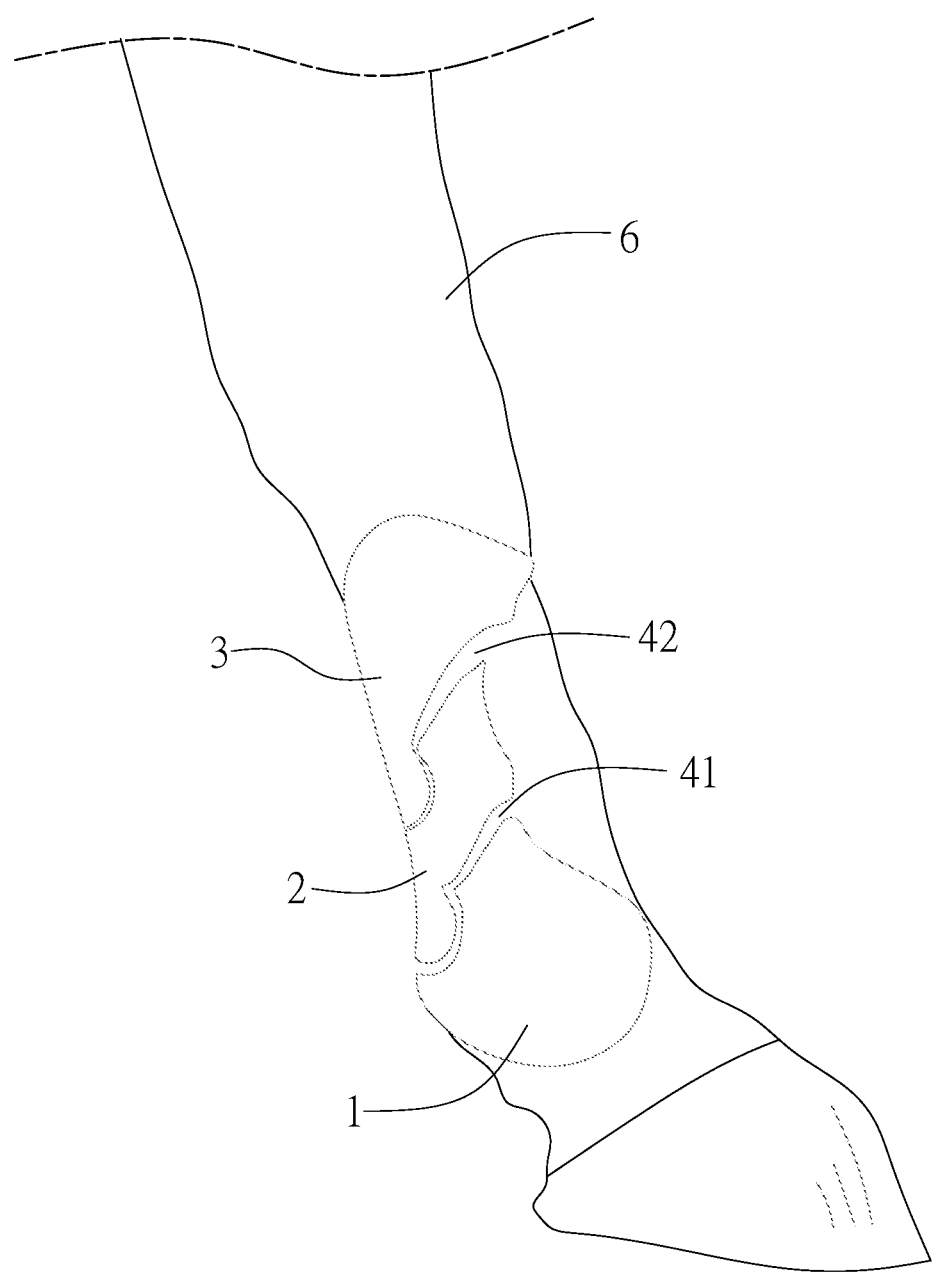
Figure 6:
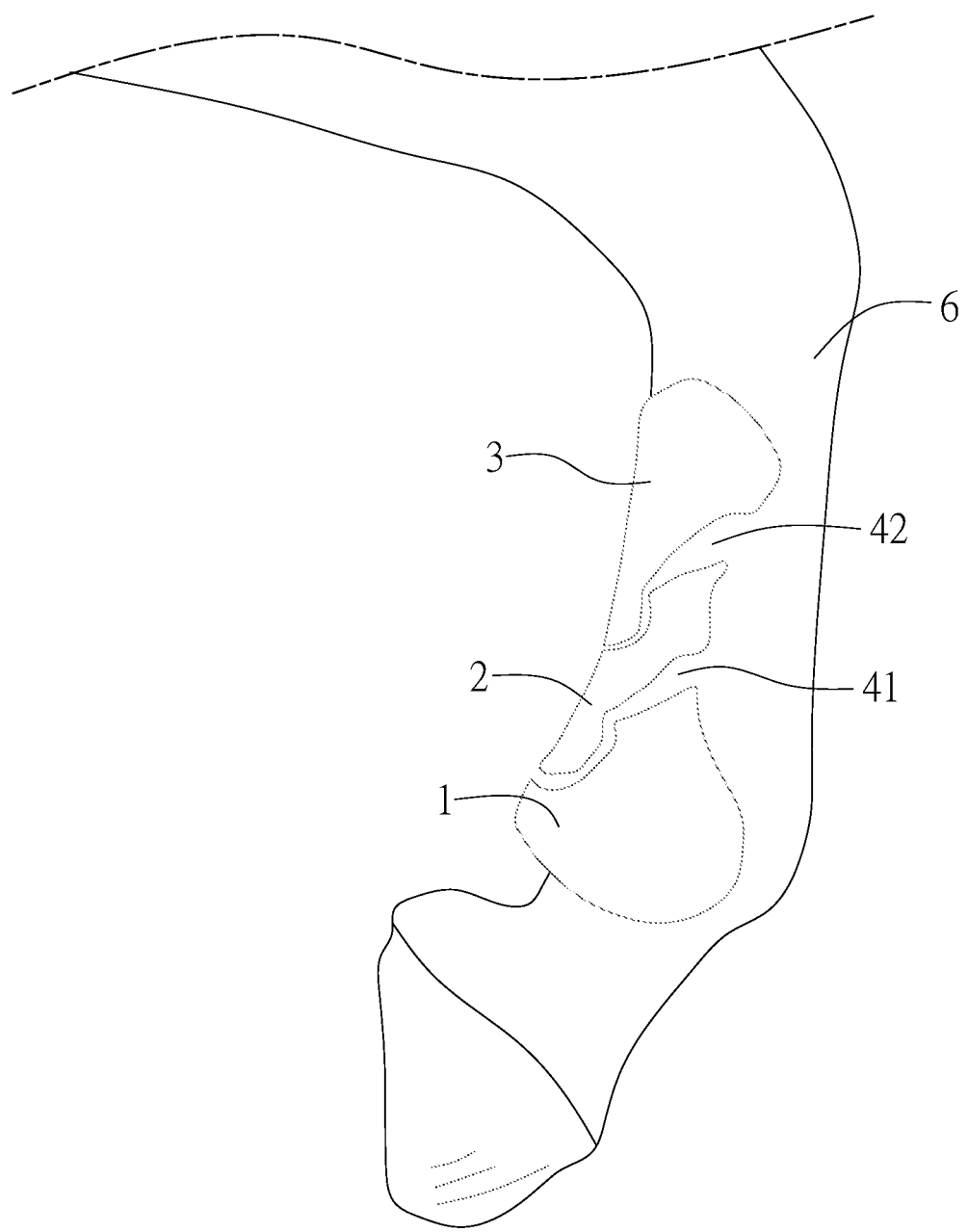
Figure 7:
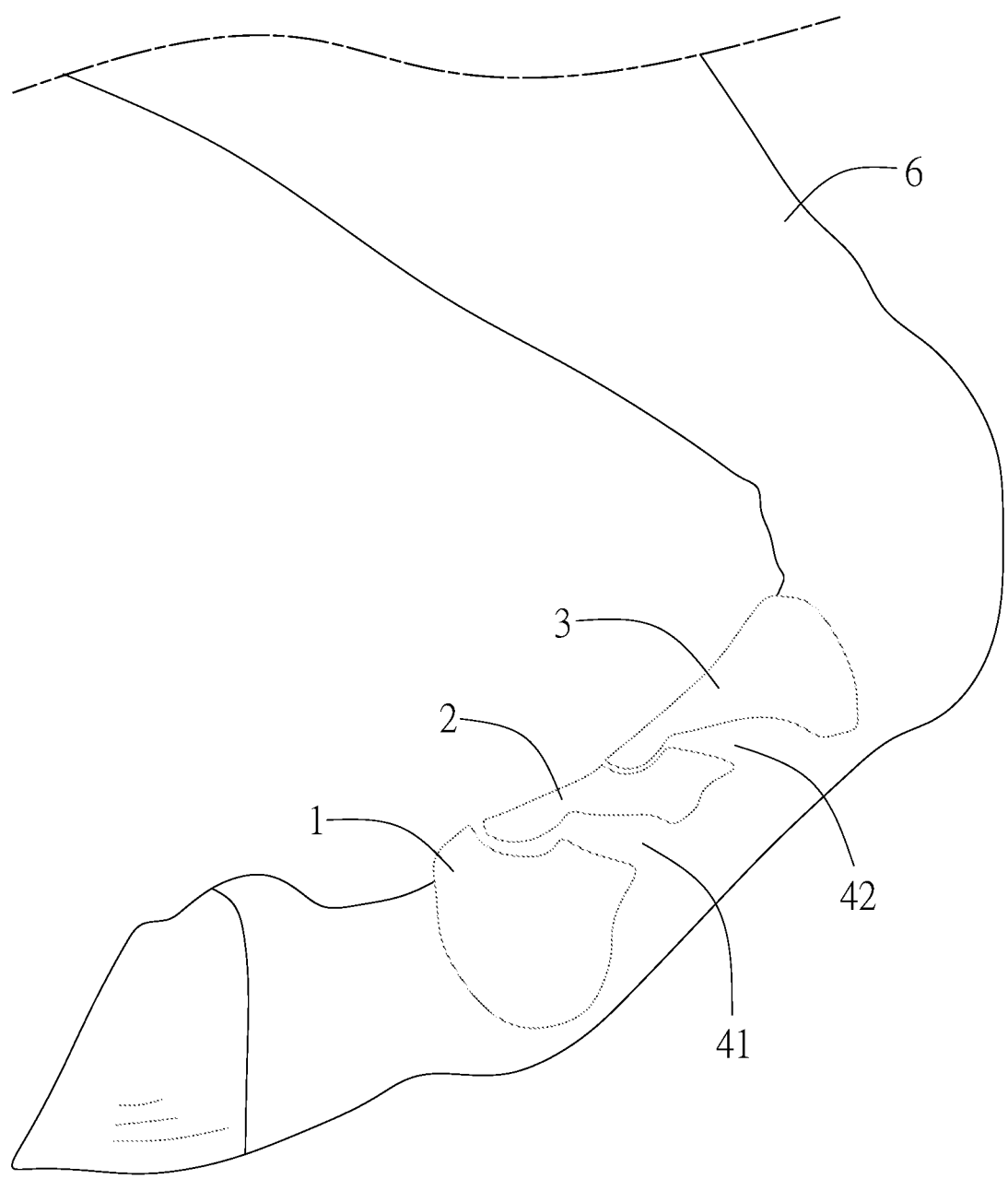
Figure 8:
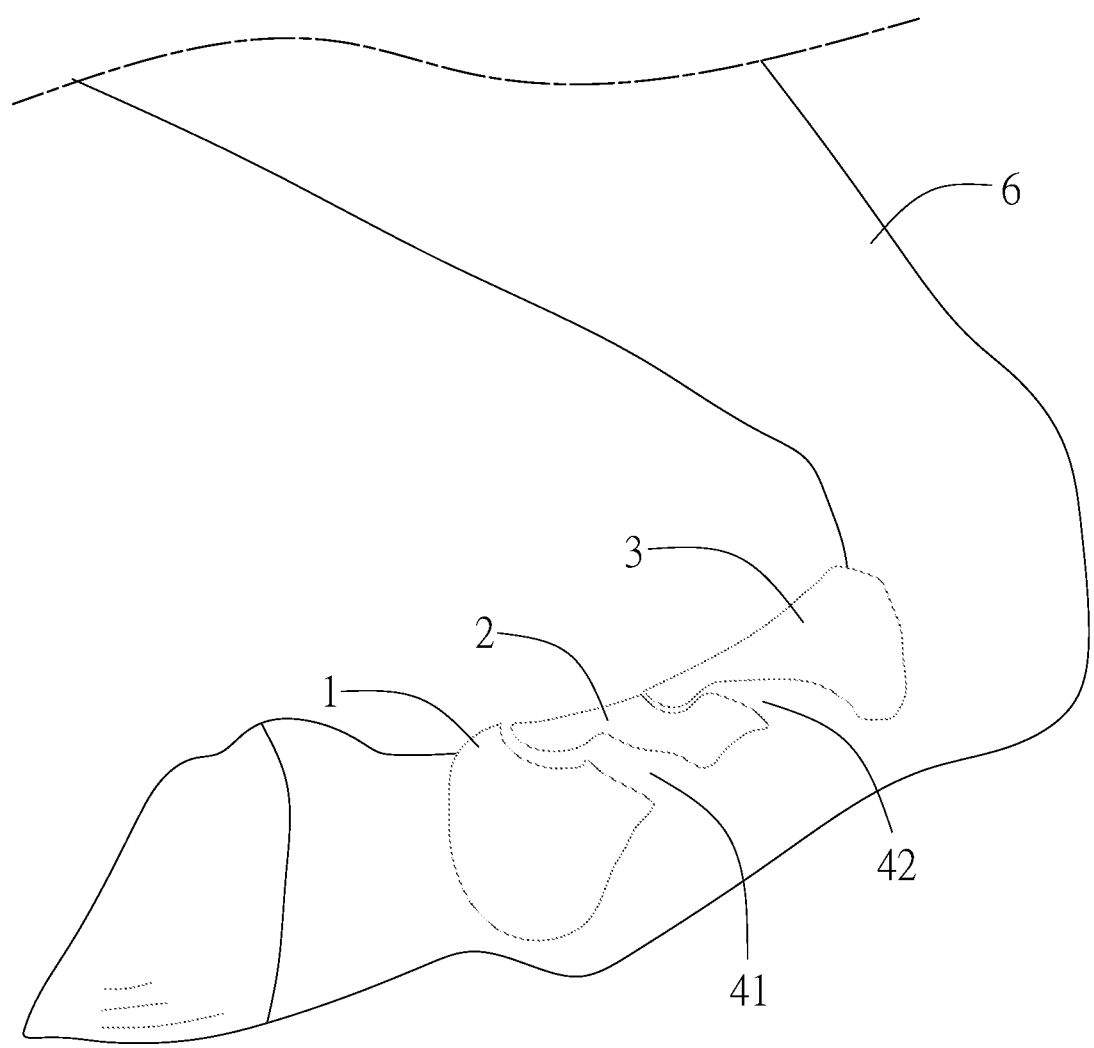

Furthermore, referring to FIG. 3, the present invention is suitable for not only the front leg 61 but also the hind leg 62.

Although the first piece 1 and the second piece 2 are connected by the first connecting portion 51, the first piece 1 still can move relative to the second piece 2 due to the first gap 41. Similarly, although the second piece 2 and the third piece 3 are connected by the second connecting portion 52, the second piece 2 still can move relative to the third piece 3 due to the second gap 42. Consequently, mobility of each of the three different parts of the protector is improved so as to easily change positions to fit on the leg all the time in the course of running.

In detail, as shown in FIG. 4-8, not only the front leg but also the hind leg moves back and forth when the horse is running. The leg 6 is straightened when it moves to a front position. At this time, the first piece 1, the second piece 2 and the third piece 3 are dragged by the straightened leg 6 to close to each other, and thus the first piece 1, the second piece 2 and the third piece 3 still can fit on the leg 6 since the first gap 41 and the second gap 42 are narrowed.

When the leg 6 is straightened so that the first gap 41 is narrowed, since the second end 412 of the first gap 41 is larger than the first end 411, there is enough bending space between the upper edge 121 of the first piece 1 and the lower edge 222 of the second piece 2 so that when the first piece 1 is bent towards the second piece 2, the upper edge 121 of the first piece 1 will not collide with the lower edge 222 of the second piece 2. The same technical features and advantages can be seen in the second gap 42, where the upper edge 221 of the second piece 2 does not collide with the lower edge 322 of the third piece 3 when the second piece 2 is bent towards the third piece 3.

On the other hand, the leg 6 is bent when it moves to a back position. At this time, the first piece 1, the second piece 2 and the third piece 3 are dragged by the bent leg 6 to leave from each other, and thus the first piece 1, the second piece 2 and the third piece 3 still can fit on the leg 6 since the first gap 41 and the second gap 42 are enlarged.

The present invention is advantageous in that the protector is divided into three parts capable of moving separately in order to easily change positions to fit on the horse leg all the time in the course of running. The horse leg obtains not only protection but also comfort, and has no disturbance for running.

What is claimed is:

1. A protector worn on a horse leg comprising:
   a first piece; and
   a second piece located above the first piece, the second piece being connected to the first piece via a first connecting portion, the second piece being movable relative to the first piece, a first gap being formed between the first piece and the second piece;
   the first gap has a first end and a second end, the first end is close to the first connecting portion, the second end is far away from the first connecting portion, a width of the first gap is enlarged from the first end to the second end;
   a size of the first gap becoming smaller when the horse leg is straightened and becoming larger when the horse leg is bent;
   the first piece includes a supporting portion connected with the first connecting portion, and a plurality of first short ribs surrounding the supporting portion, wherein a portion of the plurality of first short ribs is deposited between the supporting portion and the second piece;
   a concave edge is formed on an upper side of the first piece, a protrusion edge is formed on a lower side of the second piece and is faced to the concave edge;
   a hole is formed on the first piece, an outlet of the hole is communicated with the concave edge, the supporting portion is arranged in the hole and is connected to the first piece via the short ribs, and the protrusion edge is connected to the supporting portion via the short ribs of the outlet;
   thus, the short ribs are radially arranged around the supporting portion to increase the bending capacity of the first piece.

2. The protector worn on a horse leg of claim 1, wherein the first piece includes a curved first middle portion, each of two opposite sides of the first middle portion having a first wing portion configured to cover the horse leg.

3. The protector worn on a horse leg of claim 2, wherein the second piece includes a curved second middle portion, each of two opposite sides of the second middle portion having a second wing portion configured to cover the horse leg, a length of the second wing portion being less than that of the first wing portion, at least one of an upper edge and a lower edge of the second piece being in an arc.

4. The protector worn on a horse leg of claim 1, wherein at least one of an upper edge and a lower edge of the first piece is in an arc.

5. The protector worn on a horse leg of claim 1, wherein the supporting portion forms a polygon and is connected to a remaining part of the first piece via the plurality of first short ribs.

6. The protector worn on a horse leg of claim 1, wherein a third piece is located above the second piece, the third piece being connected to the second piece via a second connecting portion, the third piece being movable relative to the second piece, a second gap being formed between the third piece and the second piece, a size of the second gap becoming smaller when the horse leg is straightened and becoming larger when the horse leg is bent.

7. The protector worn on a horse leg of claim 6, wherein the third piece includes a curved third middle portion, each of two opposite sides of the third middle portion having a third wing portion configured to cover the horse leg, at least one of an upper edge and a lower edge of the third piece being in an arc.

* * * * *